Nov. 14, 1972   A. MACOVSKI   3,702,725

DECODING OF COLOR-ENCODED PHASE GRATING

Filed Dec. 13, 1971

United States Patent Office 3,702,725
Patented Nov. 14, 1972

3,702,725
DECODING OF COLOR-ENCODED PHASE
GRATING
Albert Macovski, Palo Alto, Calif., assignor to
RCA Corporation
Filed Dec. 13, 1971, Ser. No. 207,208
Int. Cl. G02b 27/38
U.S. Cl. 350—162.5 F          4 Claims

ABSTRACT OF THE DISCLOSURE

Apparatus is disclosed for reproducing a color image from a film on which the color image is diffraction coded by phase or thickness diffraction grating lines extending in different directions for respective different cyan, yellow and magenta subtractive primary colors. The apparatus includes a light source, a film plane, a Fourier transform plane and a utilization plane. A color filter located in the Fourier transform plane includes an opaque spot where undiffracted light from the source is imaged, two each of red, blue and green primary color filters at spots along radial axes orthogonal to the respective cyan, yellow and magenta gratings on the film, and cyan, yellow and magenta filters at spots along radial axes intermediate said red, blue and green axes, where sum and difference components of the red, blue and green components, taken two at a time, occur. The color image at the utilization plane is brightened by the cyan, yellow and magenta components, and can include saturated areas of these colors.

BACKGROUND OF THE INVENTION

My Pat. No. 3,504,606, issued on Apr. 7, 1970, describes a system for photographing an original object with a single exposure on monochromatic film in a manner so that all of the color information is present. The exposed film may be created as, or developed or translated to, a film containing the color information as density variations, or as thickness variations, in the film. Thereafter, the film is used in reproducing an image of the original object in its original color.

SUMMARY OF THE INVENTION

According to an example of the present invention, the reproduced color image is created with an increased brightness and improved color fidelity by using a film having thickness variations to transmit all the incident light, and by using a color filter in the Fourier transform plane which includes color filters located to utilize light energy which is the result of sum and difference products of light representing the primary colors.

DESCRIPTION OF THE PREFERRED EMBODIMENT

Figure 1:
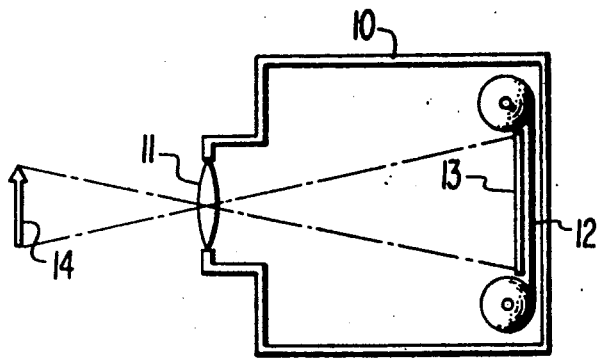
FIG. 1 is a representation of a camera for photographing a color image or scene on a film which records brightness and color information in the form of thickness variations on the film.

References now made to FIG. 1 showing a camera including an enclosure 10, a lens 11, a film 12 and a trichromatic spatial filter 13. The filter 13 is disposed in the path of light from image 14 impinging on film 12, and it is in close proximity with, or in contact with, film 12. The film 12 may be a panchromatic black and white film on which density variations are produced by the image. However, the film 12 is preferably a film on which information is recorded in the form of phase or thickness variations, as described in my Pat. No. 3,504,606, issued on Apr. 7, 1970.

Figure 2:
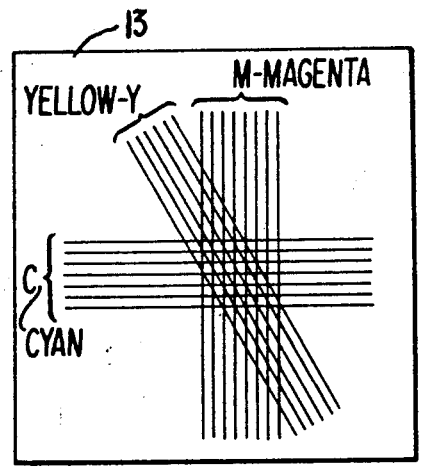
FIG. 2 is a representation of a trichromatic spatial color film utilized in the camera of FIG. 1.

The filter 13 in the camera of FIG. 1 is represented in FIG. 2 as including a large number of horizontal cyan filter strips C, a large number of vertical magenta strips M, and a large number of diagonal yellow filter strips Y. The three described sets of filter strips are in the three subtractive primary colors. The color filter strips occupy the entire effective area of the filter 13, although only a limited number of filter strips are included for reasons of clarity in the drawings. The filter strips of each color are preferably very thin and close together to preserve image definition. There may be about three hundred parallel filter strips of one color per inch. The yellow filter strips Y are shown disposed at 30° and 60° angles with the magenta and cyan filter strips, respectively. The particular angular relationships shown are advantageous, but not essential. The image light of a given color going through a corresponding filter strip grating is recorded as closely spaced lines of thickness variations on the film 13. These parallel lines have an extent in area and thickness corresponding to the extent and amount of the particular color in the original image.

Figure 3:
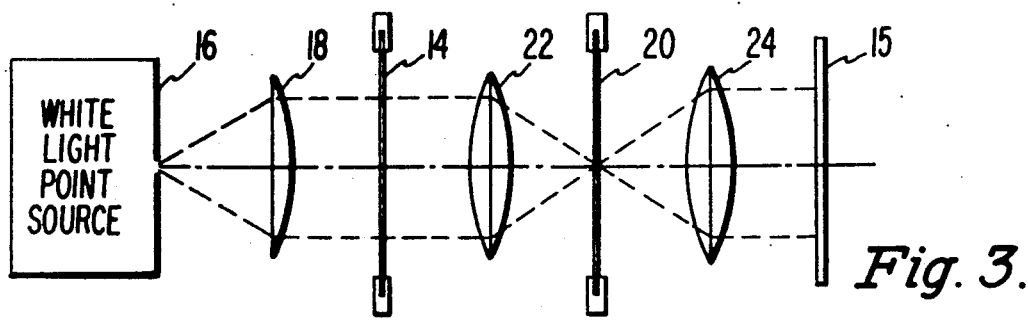
FIG. 3 is a representation of means for illuminating a color-coded film made using the camera of FIG. 1, and for projecting therefrom a reconstituted color image.

FIG. 3 illustrates a system for illuminating a film or transparency 14 made with the camera of FIG. 1 and projecting a reconstituted color image onto a screen or utilization device 15. The system includes a white light point source 16, a collimating lens 18, the color encoded film 14, a color-decoding filter 20 located in a Fourier transform plane, and a screen 15 in a utilization plane. Lenses 22 and 24 are provided to image the point source 16 of light in the Fourier transform plane including decoding filter 20, and to image the color encoded film 14 at the utilization device 15.

Figure 4:
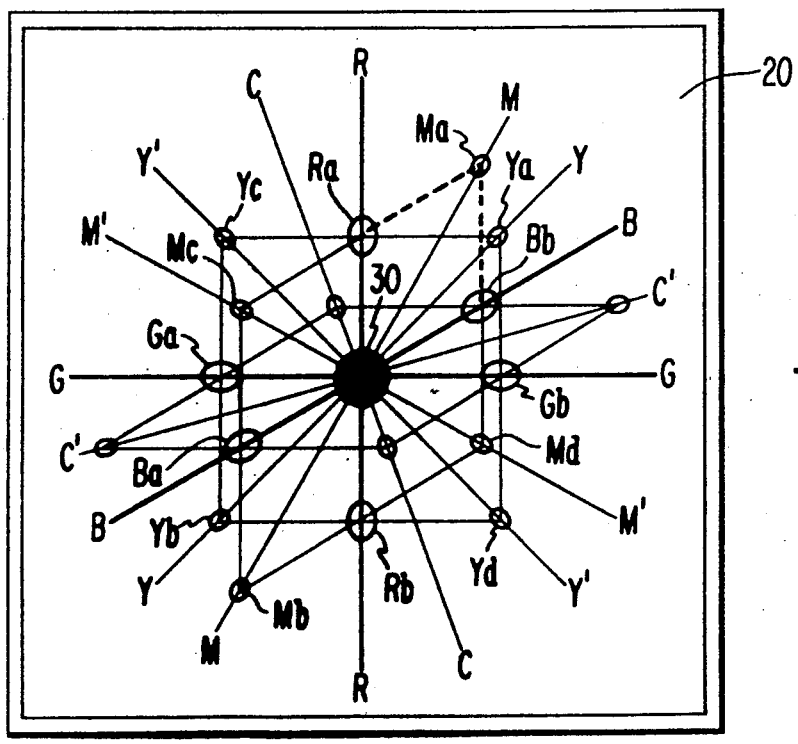
FIG. 4 is a diagram of a decoding color filter included in the system of FIG. 3.

Reference is now made to FIG. 4 for a description of the color filter 20 used in the Fourier transform plane in the projection system of FIG. 3. The filter 20 preferably comprises a transparent support for a central opaque spot 30 and a plurality of color filter spots or areas. Two red filter spots, Ra and Rb, are located on a radial axis R—R which is orthogonal to, or perpendicular with, the cyan diffraction grating C in the coding filter 13 of FIG. 2. The decoding color filter 20 of FIG. 4 also includes green spots, Ga and Gb, along an axis orthogonal to the magenta grating M in FIG. 2, and blue color filter spots Ba and Bb along axis B—B which is orthogonal to the yellow diffraction grating Y in FIG. 2. There are also second order spots further out radially along the red, blue and green axes where respective color filters may be placed. However, the amount of separated color energy at these points may not be enough to justify the use of filters at these locations.

Additional color filters are employed at spots where sum and difference products of the red, blue and green information, taken two at a time, are present. For example, magenta color filters Ma and Mb are positioned along a magenta axis M—M which bisects the angle between color axes R—R and B—B. The color filter Ma is located at the corner of a parallelogram having the central opaque spot 30 at its opposite corner, and having the color filters Ra and Bb at the remaining opposite corners. The magenta filter Ma is located at a point at which light energy representing a mixture of red and blue color information is present, and is utilized to improve the brightness and color fidelity of the displayed image.

The inclusion of the magenta filter also permits a saturated magenta color to be created on the utilization device. Another two magenta color filters, Mc and Md, are similarly arranged along an orthogonal axis M'—M', so that light passing through all four of the magenta filters contributes to the creation of magenta color on the utilization device.

In a similar manner, yellow filters Ya, Yb, Yc, and Yd are positioned along axes Y—Y and Y'—Y' to utilize yellow information due to the sum and difference products resulting from the mixture of energy along the red and green axes. Additionally, color filters are provided at appropriately indicated spots along axes C—C and C'—C' to utilize energy resulting from the mixture of blue and green energy.

The color filter shown in FIG. 4, when used with a film 14 having thickness diffraction gratings, is capable of almost 100% efficiency in terms of the brightness and color fidelity of the color image created in the utilization plane. Fully saturated yellow, magenta and cyan colors can by displayed, whereas they almost disappear when the filter 20 includes only filters of the primary colors red, blue and green. This is due to the basic nature of phase gratings. The transparent background passes some light energy containing solely white information where all three primaries are present, which is useful at the utilization plane in contributing to the brightness and color fidelity of the reproduced image.

It will be understood that the primary colors red, blue and green, and the subtractive primary colors cyan, yellow and magenta, have been chosen for purposes of illustration, and that other appropriately related colors may be employed. It will also be understood that the angles between the color encoding phase gratings on the film 13 may be varied if desired, and that this will effect the geometric positioning of the different colored filters in the decoding filter 20.

What is claimed is:

1. Apparatus for reproducing a color image from a film on which the color image is diffraction coded by phase or thickness diffraction grating lines extending in different directions for respective different subtractive primary colors, comprising:

a light source, a film plane, a Fourier transform plane and a utilization plane, lens means to image the light source at the Fourier transform plane, and to image the film plane at the utilization plane, and a color filter located in said transform plane, said filter including an opaque spot where undiffracted light from the source is imaged, two each of additive primary color filters at spots along radial axes orthogonal to said subtractive primary color gratings where first order diffracted light from said gratings occur, and subtractive primary color filters at spots along radial axes intermediate said additive primary color axes where sum and difference components of the additive primary color components, taken two at a time, occur, whereby the color image at the utilization plane is brightened by the subtractive primary color components, and can include saturated areas of these colors.

2. Apparatus as defined in claim 1 wherein said subtractive primary colors are cyan, yellow and magenta, and said additive primary colors are red, blue and green.

3. Apparatus as defined in claim 1 wherein each subtractive primary color filter is located at a corner of a parallelogram having the central opaque spot at the opposite corner, and having two additive primary color filters at the remaining two corners.

4. Apparatus as defined in claim 1 wherein said color filter comprises a transparent support on which said opaque and colored spots are positioned.

References Cited

UNITED STATES PATENTS

| | | | |
|---|---|---|---|
| 3,488,190 | 1/1970 | Smith | 350—162 SF UX |
| 3,504,606 | 4/1970 | Macovski | 350—162 SF UX |
| 3,572,900 | 3/1971 | Bouche | 350—162 SF |

JOHN K. CORBIN, Primary Examiner

U.S. Cl. X.R.

350—196, 317; 353—20, 84